United States Patent [19]

Patel

[11] Patent Number: 5,990,050
[45] Date of Patent: Nov. 23, 1999

[54] WATER SOLUBLE INVERT EMULSIONS

[75] Inventor: Arvind D. Patel, Houston, Tex.

[73] Assignee: M-I L.L.C., Houston, Tex.

[21] Appl. No.: 09/013,454

[22] Filed: Jan. 26, 1998

Related U.S. Application Data

[63] Continuation-in-part of application No. 09/004,267, Jan. 8, 1998.

[51] Int. Cl.$^6$ ............................... C09K 7/06; C09K 7/02
[52] U.S. Cl. ........................... 507/136; 507/261; 507/939
[58] Field of Search ................................... 507/136, 139, 507/261, 939

[56] References Cited

U.S. PATENT DOCUMENTS

| | | | |
|---|---|---|---|
| H1611 | 11/1996 | Patel | 507/103 |
| 4,464,269 | 8/1984 | Walker et al. | 507/136 |
| 4,747,969 | 5/1988 | Rupilius et al. | 260/415 |
| 4,830,765 | 5/1989 | Perricone et al. | 252/8.51 |
| 4,941,981 | 7/1990 | Perricone et al. | 252/8.51 |
| 4,963,273 | 10/1990 | Perricone et al. | 252/8.51 |
| 4,964,615 | 10/1990 | Mueller et al. | 252/8.551 |
| 5,057,234 | 10/1991 | Bland et al. | 252/8.51 |
| 5,072,794 | 12/1991 | Hale et al. | 175/50 |
| 5,120,708 | 6/1992 | Melear | 507/126 |
| 5,141,920 | 8/1992 | Bland et al. | 507/136 |
| 5,348,938 | 9/1994 | Mueller et al. | 507/136 |

FOREIGN PATENT DOCUMENTS

| | | | |
|---|---|---|---|
| 374671A1 | 6/1990 | European Pat. Off. | C09K 7/06 |
| 449257A2 | 10/1991 | European Pat. Off. | C09K 7/06 |
| 495579A3 | 7/1992 | European Pat. Off. | C09K 7/02 |
| 0 652271 | 5/1995 | European Pat. Off. . | |
| 0 730018 | 9/1996 | European Pat. Off. . | |
| 730018A1 | 9/1996 | European Pat. Off. | C09K 7/02 |
| 3842703A1 | 6/1990 | Germany | C09K 7/06 |
| 751191 | 6/1956 | United Kingdom . | |
| 2223255 | 4/1990 | United Kingdom | C09K 7/06 |
| 2251447 | 7/1992 | United Kingdom | C09K 7/06 |
| 2252993 | 8/1992 | United Kingdom | C09K 7/06 |
| 2283036 | 4/1995 | United Kingdom . | |
| WO89/01491 | 2/1989 | WIPO | C07K 7/00 |
| WO90/06890 | 6/1990 | WIPO . | |
| WO90/06981 | 6/1990 | WIPO . | |
| WO93/16145 | 8/1993 | WIPO | C09K 7/06 |
| WO93/23491 | 11/1993 | WIPO | C09K 7/06 |
| WO94/16030 | 7/1994 | WIPO | C09K 7/06 |
| WO96/19545 | 6/1996 | WIPO | C09K 7/06 |

OTHER PUBLICATIONS

Aldrich Katalog Handbuch Feinchemikalien, Aldrich GmbH & Co. KG, Steinheim/DE (1994), p. 557.
Dickey, Parke A.; Petroleum Development Geology, 2nd Ed.; Penn Well Books before 1988, pp. 57–83.
The Dow Chemical Company; Physical Properties Of Dowanol Glycol Ethers And Acetates; table; Jun. 1995.
The Dow Chemical Company; Material Safety Data Sheet, Oct. 20, 1997.
The Dow Chemical Company; Product Information—Dowanol DPNB, Apr. 1997.
The Dow Chemical Company; Product Information—Dowanol PNB, Apr. 1997.
The Dow Chemical Company; The Glycol Ethers Handbook, Oct. 1993.
Chemical Abstract Services Search Report, Oct. 27, 1997.

*Primary Examiner*—Philip Tucker
*Attorney, Agent, or Firm*—Arnold White & Durkee

[57] ABSTRACT

A drilling fluid and an invert emulsion fluid having utility for drilling, completing or working over subterranean oil and gas wells are disclosed. The drilling fluid includes a continuous phase that includes a preferentially-oil-soluble glycol ether which has a viscosity at 25° C. of at least 10 centipoise, and an emulsifier. The invert emulsion fluid includes a oleaginous fluid including a preferentially-oil-soluble glycol ether which is miscible in oil and is such that less than 10% by volume of the glycol ether is miscible in fresh water at 20° C., that is to say 10% by volume of the glycol ether mixed in fresh water results in two phases. The invert emulsion fluid also includes a nonoleaginous fluid and an emulsifier which is functionally effective to stabilize the invert emulsion. In one embodiment, glycol ether is selected from propylene glycol n-butyl ether; dipropylene glycol n-butyl ether; tripropylene glycol n-butyl ether; tetra propylene glycol n-butyl ether; pentapropylene glycol n-butyl ether; hexapropylene glycol n-butyl ether; heptapropylene glycol n-butyl ether and combinations thereof. The fluids of the present invention may also contain weighting agents, bridging agents, wetting agents, corrosion inhibitors and other components of drilling fluids that are known in the art.

19 Claims, No Drawings

WATER SOLUBLE INVERT EMULSIONS

This is a continuation-in-part of co-pending U.S. Patent Application entitled; "WATER SOLUBLE INVERT EMULSIONS" filed on Jan. 8, 1998 and assigned the Serial No.: 09/004,267 now pending the priority of which is hereby claimed.

BACKGROUND OF THE INVENTION

1. Field of the Invention

The present invention relates to drilling and invert emulsion fluids utilized in the drilling, completion and workover of subterranean wells and in particular oil and gas wells.

2. Background

Many types of fluids have been used in the drilling of oil and gas wells. The selection of an oil based drilling fluid involves a careful balance of the both the good and bad characteristics of such fluids. In a particular application the type of well to be drilled and the geological characteristics of the oil or gas field in which the well is to be drilled, the location of the well, and the like all affect the decision as to the type of drilling fluids used.

For a number of years, oil based drilling fluids and invert emulsion muds have been utilized in the drilling of subterranean wells. These fluids typically are comprised of a hydrocarbon oil or mixtures of oils as the major component of the liquid phase to which various materials are added to impart the desired drilling fluid properties. These fluids are well adapted for use in underground formations containing water sensitive clays or shales which swell and disintegrate when contacted by water based drilling fluids. True oil-based fluids are substantially free of water, lose mostly oil as the filtrate and cause no swelling or disintegration of water sensitive clays and shales. Water-in-oil emulsions are also used as drilling fluids. These fluids contain oil as the continuous phase and water as the external or discontinuous phase. A water-in-oil emulsion is also known as an invert emulsion. The true oil-based and the invert emulsion muds generally contain one or more weighting agents, surfactants, viscosifiers, fluid loss control agents or bridging agents.

The primary benefits of selecting an oil based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art.

An especially beneficial property of oil based drilling fluids are their excellent lubrication qualities. These lubrication properties permit the drilling of wells having a significant vertical deviation, as is typical of off shore or deep water drilling operations or when a horizontal well is desired. In such highly deviated holes, the torque and drag on the drill string are significant because the drill pipe lies against the low side of the hole. Under these conditions, the risk of pipe sticking is high when water based muds are used. In contrast oil based muds provide a thin, slick filter cake which helps to prevent pipe sticking. Thus the use of the oil based mud is preferred.

Despite the above noted benefits, the use of oil based drilling fluids and muds has it drawbacks. The initial start up and operational costs are often greater than drilling with a water based mud. However, often the higher costs can be justified if the oil based drilling fluid prevents the caving in or enlargement of the well bore which can greatly increase drilling time and well completion costs.

Environmental regulations have also severely limited the use of oil based and invert emulsion oil muds as drilling fluids. Of particular concern is the disposal of oil coated drilling cuttings especially in off shore or deep water drilling operations. Environmentally sound disposal of oil-coated cuttings is required which in these latter cases, the cuttings must be either processed onboard the drilling rig, or the cuttings must be shipped back to shore for disposal in an environmentally safe manner.

In view of the above, there exists a need for an oil based drilling fluid or invert mud emulsion that is soluble in sea water, especially cold sea water, yet stable under down-hole drilling conditions. Such a fluid can reduce the environmental impact of drilled cuttings discharged to the sea floor.

SUMMARY OF THE INVENTION

The present invention is generally directed to a drilling fluid that is useful in the drilling, completing and working over of subterranean wells, preferably oil and gas wells. In one embodiment the drilling fluid includes a continuous phase that has at least one preferentially-oil-soluble glycol ether having a viscosity of less than 10 centipoise at 25° C. and an emulsifier. In another embodiment, the continuous phase of an invert emulsion includes a glycol ether that is soluble in oil and other oleaginous fluids at 20° C. but is minimally soluble in aqueous solutions such as deionized water, fresh water, sea water, and calcium chloride brine at that temperature. Propylene glycol n-butyl ethers have been found to be useful in the practice of the present invention. In particular, propylene glycol n-butyl ether (PNB), dipropylene glycol n-butyl ether (DPNB), tripropylene glycol n-butyl ether (TPNB), tetrapropylene glycol n-butyl ether (TtPNB), pentapropylene glycol n-butyl ether (PPNB), hexapropylene glycol n-butyl ether (HxPNB), heptapropylene glycol n-butyl ether (HpPNB) and mixtures thereof have been found to be suitable for the continuous phase of the drilling fluids and invert emulsions of the present invention. Drilling fluid additives including lubricants, weighting agents, surfactants and emulsifying agents, bridging agents, organophilic clays and other suspending agents and the like may be used in the drilling fluids of the present invention.

DESCRIPTION OF ILLUSTRATIVE EMBODIMENTS

The present invention is generally directed to drilling fluids and invert emulsions that are useful in the drilling, completing and working over of subterranean wells, preferably oil and gas wells. The use of drilling fluids and invert emulsions in the drilling of oil and gas wells should be known to one of skill in the art as is noted in the book *COMPOSITION AND PROPERTIES OF DRILLING AND COMPLETION FLUIDS*, 5th Edition, H. C. H. Darley and George R. Gray, Gulf Publishing Company, 1988, the contents of which are hereby incorporated herein by reference.

The following terms are used herein and mean the following:

"oleaginous fluid" is a fluid that is miscible at 20° C. with mineral oil or similar hydrocarbon that may be conventionally used to form the continuous phase of an invert emulsion;

"preferentially-oil-soluble glycol ether" is a glycol ether which at 20° C. is: 1) miscible at all proportions with oil, specifically with ISOPAR-M, but 2) has limited miscibility with water, specifically less than 10% by volume of the glycol ether is miscible in fresh water that is to say 10% by volume of the glycol ether mixed with fresh water results in two phases. ISOPAR-M is a isoparaffinic hydrocarbon mineral oil supplied by Exxon Chemical;

"glycol ether" is a compound having the general formula:

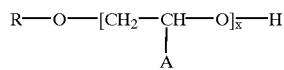

wherein R is an alkyl group, x is an integer greater than or equal to 1, and A is $CH_3$ or H or a combination of the two;

"nonoleaginous fluid" is a fluid which is not miscible with oil at 20° C.;

"invert emulsion" is an emulsion of a oleaginous fluid and a nonoleaginous fluid in which the oleaginous fluid forms the continuous phase and the nonoleaginous fluid forms the discontinuous phase.

One illustrative embodiment of the present invention is a drilling fluid including one or more preferentially-oil-soluble glycol ethers in the continuous phase of the drilling fluid and an emulsifying agent. The glycol ether preferably has a viscosity of less than 10 centipoise at 25° C. In one embodiment, the glycol ether preferably comprises at least 5% by volume of the continuous phase of the drilling fluid and preferably comprises at least 50% by volume of the continuous phase of the drilling fluid. The drilling fluid may optionally include a lubricant or an oil. The lubricant oil may be selected from the group including mineral oil, vegetable oil, synthetic oil, silicone oil, combinations of these and the like. Examples of vegetable oils include corn oil, soy bean oil, sunflower oil, safflower oil, rapeseed oil, peanut oil, cottonseed oil, rice bran oil, castor bean oil, linseed oil and the like. A synthetic oil may be selected from the group including esters, ethers, dialkyl carbonates, acetals or synthetic hydrocarbons which are suitable for such purposes. Examples of such compounds include, polyalphaolefins, polyethylene glycol, monocarboxylic acid esters of $C_2$ to $C_{12}$ alkanol such as those disclosed in U.S. Pat. No. 5,232,910, the contents of which are incorporated herein by reference, dialkyl carbonates in which the alkyl groups have more than 2 carbon atoms, acetals in which the alkoxy groups have more than 2 carbon atoms and the like. In one embodiment the glycol ether is selected form the group including propylene glycol n-butyl ether (PNB); dipropylene glycol n-butyl ether (DPNB); tripropylene glycol n-butyl ether (TPNB); tetrapropylene glycol n-butyl ether (TtPNB); pentapropylene glycol n-butyl ether (PnPNB); hexapropylene glycol n-butyl ether (HxPNB); heptapropylene glycol n-butyl ether (HpPNB) and the t-butyl ethers of these. In another embodiment propylene glycol n-butyl ether or dipropylene glycol n-butyl ether are preferred. The present invention may be carried out using a mixture of glycol ethers. For example a mixture may include tripropylene glycol n-butyl ether, tetrapropylene glycol n-butyl ether, pentapropylene glycol n-butyl ether an d hexapropylene glycol n-butyl ether herein referred to as polypropylene glycol n-butyl ether (PPNB). An example of such a mixture is commercially available from Shrieve Chemical Co. under the name Drill-Col 545-X which is also referred to herein as PPNB.

It should be noted that unlike previously disclosed drilling fluids in which glycol ethers form the continuous phase, the glycol ethers of the present invention are sufficiently immiscible to form an invert emulsion regardless of the salinity or lack of salinity of the aqueous phase. The glycol ethers previously disclosed, such as those in U.S. Pat. No. 5,057, 234 and U.K. Patent Application GB2,252,993, are soluble in deionized water, fresh water and sea water, but not in brine. The previously disclosed glycol ethers depend on salinity to maintain water immiscibility whereas those of the present invention rely on temperature. That is to say, the glycol ethers of the present invention are not miscible with aqueous solutions at formation temperatures which are typically greater than 20° C. and yet remain miscible in fresh water or sea water at temperatures less than 20° C.

The glycol ethers of the present invention are selected so as to be preferentially-oil-soluble glycol ethers. As previously noted, a preferentially-oil-soluble glycol ether is a glycol ether which at 20° C. is: 1) miscible at all proportions with oil, specifically with ISOPAR-M, and 2) less than 10% by volume miscible in fresh water, specifically 10% by volume of the glycol ether mixed in fresh water results in two phases.

Another illustrative embodiment of the present invention is an invert emulsion fluid which has utility for drilling, completing or working over subterranean wells and in particular oil and gas wells. This particular embodiment includes an oleaginous fluid that includes a preferentially-oil-soluble glycol ether, such as those previously disclosed. The embodiment further includes a nonoleaginous fluid and an emulsifier the latter of which is functionally effective and is present in a concentration to stabilize the invert emulsion. The nonoleaginous fluid may be selected from aqueous solutions including deionized water, fresh water, sea water, calcium chloride brines, brines containing organic or inorganic dissolved salts, an aqueous liquid containing water-miscible organic compounds and combinations thereof. The amount of the nonoleaginous fluid is typically less than the theoretical limit needed for forming an invert emulsion. Thus in one embodiment the amount of nonoleaginous fluid is less that about 70% by volume and preferably from about 1% to about 70% by volume. In another embodiment, the nonoleaginous fluid is preferably from about 5% to about 60% by volume of the invert emulsion fluid. In one such embodiment the oleaginous fluid comprises greater than 30% by volume of said invert emulsion. The oleaginous fluid should form an invert emulsion with the nonoleaginous fluid at formation temperatures and yet be miscible with cold sea water. It is preferred that the invert emulsion form at temperatures above 20° C. and more preferably at temperatures above 15° C. (59° F.). Such embodiments allow the formation of invert emulsions that are useful in drilling operations, but also permit the disposal at sea of the drilling fluid coated drilling cuttings without the environmental concerns typically encountered using conventional oil based drilling fluids.

The present invention is especially useful in cases where the formation temperature is at a temperature where the glycol ether forms the continuous phase of a invert emulsion and the surrounding ocean water is at a temperature where the glycol ether is miscible with sea water. For example, a formation may have a temperature of 90° C. (194° F.) while the waters surrounding the drilling platform may be 10° C. (50° F.) or colder. In such situations, a drilling operation utilizing the present invention can utilize the present invention in drilling operations downhole where the temperature is greater than the solubility temperature of the glycol ether. However, upon return of the fluids and cuttings to the surface, the drilling cuttings, which are naturally coated with the drilling fluid, may be disposed of at sea without the need for extensive washing. One is able to do this, subject to regulatory approval, because the surrounding sea water is at or below the temperature at which the glycol ether is soluble. In particular, the glycol ether is soluble at ocean floor temperatures, and thus the impact on benthic life is minimal or short lived.

The fluids of the present invention may further contain additives depending upon the end use of the drilling fluid or invert emulsion so long as the additives do not interfere with the properties of the fluids described herein. For example, wetting agents, organophilic clays, viscosifiers, weighting agents, bridging agents, fluid loss control agents, and corrosion inhibitors may be added to the fluid compositions of this invention for additional functional properties. The addition of such agents should be well known to one of skill in the art of formulating drilling fluids and muds.

Wetting agents and emulsifiers that may be suitable for use in this invention include, crude tall oil, oxidized crude tall oil, surfactants, organic phosphate esters, modified imidazolines and amidoamines, alkyl aromatic sulfates and sulfonates, and the like, and combinations or derivatives of these. Versawet® and Versacoat® and Novamul are examples of commercially available emulsifiers manufactured and distributed by M-I, L.L.C. that may be used in this invention. Silwet L-77, L-7001, L7605 and L-7622 are examples of commercially available surfactants and wetting agents manufactured and distributed by Union Carbide Chemical Company Inc.

Organophilic clays, normally amine treated clays, may be useful as viscosifiers in the fluid compositions of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 6% by weight range are sufficient for most applications. VG-69 and VG-PLUS are organoclay materials distributed by M-I, L.L.C., and Versa-HRP is a polyamide resin material manufactured and distributed by M-I, L.L.C., that may be used in this invention.

Weighting agents or density materials suitable for use in this invention include hematite, magnetite, iron oxides, illmenite, barite, siderite, celestite, dolomite, calcite, magnesium oxides, halites and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

Fluid loss control agents typically act by coating the walls of the borehole as the well is being drilled. Suitable fluid loss control agents which may find utility in this invention include modified lignites, asphaltic compounds, gilsonite, organophilic humates or tannins prepared by reacting humic acid or tannic acid with amides or polyalkylene polyamines, and latex polymers. Typically, fluid loss control agents are added in amounts less than about 10% and preferably less than about 5% by weight of the fluid.

Corrosion inhibitors may also be added to the drilling fluid compositions of this invention to control the corrosion of the drilling equipment used during the drilling operation. Depending upon the type of corrosion encountered, the corrosion inhibitor may be organic or inorganic or some combination thereof. Illustrative examples of such corrosion inhibitors include phosphates, silicates, borates, zinc compounds, organic amines, benzoic acid, and benzoic acid derivatives, phosphate esters, heterocyclic nitrogen and sulfur compounds, organic acids and the like.

In view of the above, one of skill in the art should appreciate the usefulness of the above described drilling and invert emulsion fluids. Thus one embodiment of the present invention is the use of such invert emulsion fluids in the drilling, completion and workover of oil and gas wells.

Because many of properties of the invert emulsion of the present invention are similar to those of conventional invert emulsions, the application of the fluids should be apparent to one of skill in the art.

The following examples are included to demonstrate preferred embodiments of the invention. It should be appreciated by those of skill in the art that the techniques and compositions disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

GENERAL INFORMATION RELEVANT TO THE EXAMPLES

These tests were conducted in accordance with the procedures in API Bulletin RP 13B-2, 1990. The following abbreviations are used in describing the following examples:

"PNB" is propylene glycol n-butyl ether.

"DPNB" is dipropylene glycol n-butyl ether.

"TPNB" is tripropylene glycol n-butyl ether.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"GELS" is a measure of the suspending characteristics, or the thixotropic properties of a drilling fluid, measured in pounds per 100 square feet (lb/100 ft$^2$).

The following general procedure was used in mixing the mud formulations: The glycol ether, lime and organophilic clay were mixed for 15 min. on a Hamilton Beach mixer in a suitable mixing jar. Emulsifier was added and the combination was further mixed for 10 min. The non-oleaginous fluid was then added and mixed for 15 min. to for the internal phase of the invert emulsion. Weight material (typically barite) was added and the jar contents were mixed for 20 min. The initial and heat aged (HA) fluid properties were measured at the indicated temperatures.

EXAMPLE 1

Invert drilling fluids were prepared according to the following formulations. All the materials are in grams.

| Formulation Material | Mud 1 | Mud 2 | Mud 3 |
|---|---|---|---|
| glycol ether | PNB | DPNB | 545-X |
|  | 174 | 174 | 174 |
| lime | 4 | 4 | 4 |
| VG-Plus | 4 | 4 | 3 |
| Versacoat | 3 | 3 | 3 |
| Versa-Wet | 3 | 3 | 3 |
| Tagopren-7006 | 6 | 6 | 6 |
| 25% CaCl$_2$Brine | 90 | 90 | 90 |
| Barite | 229 | 229 | 229 |

In the above table, the PNB and DPNB glycol ethers available from Dow Chemical; 545-X is a mixture of polypropylene glycol n-butyl ether compounds available from Shrieve Chemical Co.; VG-PLUS is an organophilic clay available from M-I, L.L.C.; Versacoat is an emulsifier available from M-I, L.L.C.; Versa-Wet is an oxidized crude oil wetting agent available from M-I, L.L.C.; Tagopren-7006 is a silicone emulsifier available from Goldschmidt Chemical Co.; and all other components are technical grade chemicals commonly available.

The following rheologies were measured at room temperature after the above formulated fluids were heat aged at 150° F. for 16 hours:

|  | Mud 1 | Mud 2 | Mud 3 |
|---|---|---|---|
| Plastic Viscosity (PV) | 20 | 22 | 30 |
| Yield Point (YP) | 5 | 7 | 11 |
| Gel Strength |  |  |  |
| 10 sec. | 3 | 3 | 6 |
| 10 min. | 5 | 4 | 7 |
| Electrical Stability (E.S.) | 11 | 23 | 55 |

The above fluids were further heat aged at 250° F. for 16 hours. Upon cooling, the fluids were mixed for 15 min. and the following rheological properties were measured at room temperature:

|  | Mud 1 | Mud 2 | Mud 3 |
|---|---|---|---|
| Plastic Viscosity (PV) | 24 | 23 | 29 |
| Yield Point (YP) | 3 | 9 | 8 |
| Gels |  |  |  |
| 10 sec. | 4 | 4 | 4 |
| 10 min. | 4 | 4 | 4 |
| Electrical Stability (E.S.) | 11 | 24 | 50 |

Upon review of the above results, one of skill in the art should understand that stable drilling fluid formulations can be prepared utilizing glycol ethers of the present invention.

The above fluids after heat aging at 250° F. for 16 hours were contaminated with simulated drilled solids (25 g. Rev. Dust) and further heat aged at 250° F. for 116 hours. The following Theological properties were measured at 120° F.

|  | Mud 1 w/Rev. Dust | Mud 2 w/Rev. Dust | Mud 3 w/Rev. Dust |
|---|---|---|---|
| PV | 36 | 34 | 29 |
| YP | 4 | 8 | 7 |
| Gels |  |  |  |
| 10 sec. | 5 | 5 | 4 |
| 10 min. | 6 | 7 | 6 |
| E.S. | 12 | 32 | 69 |

Upon review of the above, one skilled in the art should realize that the above drilling fluids will be useful in the drilling of oil and gas wells.

EXAMPLE 2

The following invert-drilling fluids were prepared according to the following formulations. All values for materials are in grams.

| Formulation | Mud 4 | Mud 5 |
|---|---|---|
| glycol ether | PNB | DPNB |
|  | 174 | 174 |
| lime | 4 | 4 |
| VG-Plus | 4 | 4 |
| Versa-Coat | 8 | 8 |
| Versa-Wet | 2 | 2 |
| 25% CaCl$_2$Brine | 91 | 91 |
| Barite | 229 | 229 |

In the above table, the PNB and DPNB glycol ethers available from Dow Chemical; VG-PLUS is an organophilic clay available from M-I, L.L.C.; Versa-Coat is a surfactant package available from M-I, L.L.C.; and all other components are either the same as noted above in Example 1 or are technical grade chemicals commonly available.

The following initial and heat aged (HA) properties were measured at indicated temperatures

|  | Mud 4 | | Mud 5 | |
|---|---|---|---|---|
|  | Initial (at 80° F.) | HA/250° (at 120° F.) | Initial (at 80° F.) | HA/250° (at 120° F.) |
| PV | 26 | 23 | 32 | 31 |
| YP | 10 | 3 | 36 | 11 |
| Gels |  |  |  |  |
| 10 sec. | 5 | 5 | 18 | 9 |
| 10 min. | 5 | 6 | 19 | 11 |
| E.S. | 6 | 10 | 17 | 26 |

Upon review of the above, one skilled in the art should appreciate that the above drilling fluids are suitable for use in the drilling of oil and gas wells.

EXAMPLE 3

The following experiment was carried out to indicate the shale inhibition of the fluids of this invention.

Each of the drilling fluids of Example 2 were separately mixed with 25.0 grams of shale drilling cutting. As a control, 25 grams of shale drilling cuttings were mixed with water. The mixtures were hot rolled at 150° for 16 hours. After hot rolling the shale cuttings were separated on 80 mesh screen. The shale cutting were washed with petroleum ether and dried in air 100° F. The weight of the shale drilling cuttings were measured after drying off the petroleum ether. The following recovery of the shale drilling cuttings was obtained after the above described hot rolling treatment.

|  | Mud 4 PNB | Mud 5 BPNB | Control H$_2$O |
|---|---|---|---|
| Grams recovered | 24.93 | 25.1 | 0 |
| % recovery | 99.7% | 100.4 | 0 |

In the water control, all the shale drilling cuttings were dispersed without any recovery. In contrast, nearly total recovery was achieved with the glycol ether based drilling fluids of the present invention. One skilled in the art should appreciate from the above experiments indicate that the glycol fluids of this invention inhibit the hydration of shale and would understand that the drilling fluids should not have an adverse effect on shale formations encountered during the drilling of a subterranean well.

EXAMPLE 4

The following experiment was carried out to show the temperature effects on the solubility in sea water of the glycol ethers utilized in the formulations of the drilling fluids of the present invention.

Propylene glycol n-butyl ether (PNB), dipropylene glycol n-butyl ether (DPNB), tripropylene glycol n-butyl ether (TPNB) and polypropylene glycol n-butyl ether (PPNB) were all tested. Glycol ether and deionized water (DI) or sea water (SW) were mixed to give the % volume mixtures shown. The mixture was then cooled to −10° F. Each sample was slowly allowed to warm to 80° F. and was visually observed. The temperature at which the mixtures became cloudy, i.e. the cloud point temperature of each sample was recorded. The cloud point temperature is the temperature at which the glycol ether begins to become insoluble in water. The following results were obtained:

|  | PNB | DPNB | TPNB | PPNB |
|---|---|---|---|---|
| 5% Glycol ether |  |  |  |  |
| DI °C. (° F.) | 11.6 (53) | 8.3 (47) | 5 (41) | 0 (<32) |
| SW °C. (° F.) | 10 (50) | 6.1 (43) | 3.3 (38) | 0 (<32) |
| 10% Glycol ether |  |  |  |  |
| DI °C. (° F.) | 0 (32) | 0 (<32) | 0 (<32) | 0 (<32) |
| SW °C. (° F.) | 0 (<32) | 0 (<32) | 0 (<32) | 0 (<32) |

Upon review of the above data, one skilled in the art should realize that glycol ethers in the drilling fluids of the present invention will be miscible in cold sea water and yet will be two phases with water at temperatures and concentrations typical of drilling with invert emulsion muds.

EXAMPLE 5

The following experiment was carried out to show the solubility properties of the glycol ethers utilized in the formulations of the drilling fluids of the present invention as compared to those ether materials previously disclosed.

PPG-400 (a polypropylene glycol having an average molecular weight of 400 AMU); PPG-600 (a polypropylene glycol having an average molecular weight of 600 AMU); propylene glycol n-butyl ether (PNB), dipropylene glycol n-butyl ether (DPNB), tripropylene glycol n-butyl ether (TPNB) and polypropylene glycol n-butyl ether (PPNB) were all tested. The glycol ether was added to the test solvent to give a 20% volume mixture. In the following table the test solvents were deionized water (DI); sea water (SW); $C_{16}$–$C_{18}$ iso-olefin hydrocarbon (IO); and LVT-200 mineral oil (MO). Solubility was determined at 20° C. (68° F.) with "yes" indicating complete miscibility and "no" less than 10% miscibility. The following results were obtained:

| Test solvent | glycol | | | | | |
|---|---|---|---|---|---|---|
|  | PPG-400 | PPG-600 | PNB | DPNB | TPNB | PPNB |
| DI | Yes | Yes | No | No | No | No |
| SW | Yes | Yes | No | No | No | No |
| IO | No | No | Yes | Yes | Yes | Yes |
| MO | No | No | Yes | Yes | Yes | Yes |

Upon review of the above data, one skilled in the art should realize that drilling fluids in which the continuous phase are the glycol ethers of the present invention will be soluble in oils and other oleaginous fluids unlike those previously disclosed.

EXAMPLE 6

The following mud formulations were prepared to demonstrate the utility of glycol ethers of this invention to prepare invert emulsion drilling fluids in a de-ionized water (D.I. water), fresh water (tap water), sea water and 25% $CaCl_2$ brine.

| Formulation | Grams |
|---|---|
| TPNB | 177 |
| Lime | 4.0 |
| VG PLUS | 4.0 |
| NOVAMUL | 8.0 |
| VERSA WET | 2.0 |
| Sil Wet - 766 | 2.0 |
| Aqueous Phase | 84 (ml) |
| Barite | 224 |

The above formulations were mixed separately with deionized water (DI water), fresh water, sea water and 25% $CaCl_2$ brine used as aqueous phase. These formulations were heat aged at 150° F. for 16 hours. The following rheologies were measured at room temperature before (Initial) and after heat aging (HA). Conductivity for each sample was measured in microsiemens using a traceable conductivity meter from Fischer Scientific Co.

|  | Mud-6 D.I. Water | | Mud-7 Fresh Water | | Mud-8 Sea Water | | Mud-9 $CaCl_2$ | |
|---|---|---|---|---|---|---|---|---|
|  | Initial | HA | Initial | HA | Initial | HA | Initial | HA |
| E.S. | 17 | 17 | 16 | 18 | 16 | 21 | 35 | 48 |
| Conductivity (μs/cm) | 6.8 | 5.2 | 7.9 | 6.9 | 8.1 | 5.6 | 2.9 | 2.2 |
| PV | 45 | 56 | 51 | 58 | 50 | 59 | 41 | 58 |
| YP | 9 | 8 | 8 | 9 | 9 | 6 | 38 | 35 |
| Gels |  |  |  |  |  |  |  |  |
| 10 sec | 6 | 7 | 7 | 7 | 7 | 5 | 15 | 16 |
| 10 min. | 8 | 9 | 9 | 10 | 9 | 7 | 20 | 17 |

In view of the above results, one of skill in the art should conclude that the stability of invert emulsions formed with the drilling fluids of this invention do not depend on the salinity of the aqueous phase and that the electrical conductivity of the mud is to some extent adjustable.

EXAMPLE 7

Portions of the mud formulations from Example 6 were mixed with 3% lubricant by volume of the drilling fluid and heat aged at 150° F. for 8 hours. Illustrative lubricants included: Silicone Fluid A-50 from Union Carbide; isopropyl palmitate; isomerized olefin (I.O. $C_{16}$–$C_{18}$) available from Amoco Chemicals; and LVT-200 which is a mineral oil available from Conoco. The following rheological properties were measured at room temperature after heat aging.

| Lubricant | Mud-6 Silicone Fluid A-50 | Mud-7 iso-propyl palmitate | Mud-8 I.O. $C_{16}$–$C_{18}$ | Mud-9 LVT-200 |
|---|---|---|---|---|
| E.S. | 22 | 16 | 20 | 35 |
| PV | 33 | 34 | 32 | 37 |
| YP | 8 | 9 | 12 | 40 |
| Gels | | | | |
| 10 sec. | 4 | 3 | 5 | 18 |
| 10 min. | 5 | 5 | 5 | 23 |

The above results should indicate to one of skill in the art that the drilling fluids formulations of this invention are compatible with various oils and lubricants.

EXAMPLE 8

Portions of the mud formulations from Example 6, were mixed with 15 g of shale drilling cuttings. As controls, 15 grams of shale drilling cuttings were mixed with water and 70:30 polypropylene glycol—400 (PPG)/water ratio fluid. The mixtures were hot rolled at 150° F. for 90 minutes. After hot rolling the shale cuttings were separated on 80 mesh screen then washed with petroleum ether and dried. The following recovery of the drilling cuttings was obtained.

| | Water | 70:30 PPG/$H_2O$ | Mud-6 | Mud-7 | Mud-8 | Mud-9 |
|---|---|---|---|---|---|---|
| % Recovered | 0 | 0 | 100 | 100 | 100 | 100 |

Upon review, one of skill in the art should understand that in water and 70:30 polypropylene glycol/water samples, the shale dispersed. In contrast the shale was fully recovered from the fluids of the present invention. The above experiments show the shale inhibition of drilling fluids of present invention.

EXAMPLE 9

The following experiment was carried out to demonstrate the solubility of the glycol ethers of this invention in a hydrocarbon solvent. For this example the ISOPAR-M solvent is a mineral oil available from Exxon Chemicals. Representative glycol ethers of the present inventions were mixed in an equal volume ratio with ISOPAR-M at 20° C. The following was observed:

| glycol ether | PNB | DPNB | TPNB | PPNB |
|---|---|---|---|---|
| solubility | yes | yes | yes | yes |

Upon review by one of skill in the art, the above results indicate that glycol ethers of this invention are miscible with ISOPAR-M at 20° C.

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention as it is set out in the following claims.

What is claimed is:

1. A drilling fluid comprising
   a continuous phase including at least one glycol ether selected from propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether and combinations thereof, and
   an emulsifier
   said glycol ether having a viscosity at 25° C. of less than 10 centipoise.

2. The drilling fluid of claim 1 wherein the glycol ether comprises at least 5% by volume of the continuous phase.

3. The drilling fluid of claim 2 wherein the glycol ether comprises at least 50% by volume of the continuous phase.

4. The drilling fluid of claim 1 further comprising a lubricant.

5. The drilling fluid of claim 1 further comprising an oil.

6. The drilling fluid of claim 5 wherein at 20° C. the continuous phase of said drilling fluid consists essentially of glycol ether and oil.

7. The drilling fluid of claim 5 wherein the oil is selected from the group consisting of mineral oil, vegetable oil, synthetic oil or mixtures thereof.

8. The drilling fluid of claim 7 wherein the synthetic oil is selected from the group consisting of ester, ether, dialkyl carbonate, acetal or synthetic hydrocarbon.

9. The drilling fluid of claim 6 wherein the oil is selected from the group consisting of mineral oil, vegetable oil, synthetic oil or mixtures thereof.

10. The drilling fluid of claim 9 wherein the synthetic oil is selected from the group consisting of ester, ether, dialkyl carbonate, acetal or synthetic hydrocarbon.

11. The drilling fluid of claim 1 wherein the glycol ether is a polypropylene glycol n-butyl ether.

12. An invert emulsion fluid having utility for drilling, completing, or working over subterranean wells, said fluid comprising:
    an oleaginous fluid including a glycol ether, said glycol ether being at 20° C. miscible with oil and being less than 10% by volume of the glycol ether is miscible in fresh water at 20° C., and wherein said glycol ether is selected from propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether and combinations thereof,
    a nonoleaginous fluid; and
    an emulsifier, said emulsifier being functionally effective to stabilize the invert emulsion.

13. The invert emulsion fluid of claim 12 wherein said oleaginous fluid comprises greater than 30% by volume of said invert emulsion fluid.

14. The invert emulsion fluid of claim 12 wherein said nonoleaginous fluid is selected from the group consisting of fresh water, sea water, a brine containing organic or inorganic dissolved salts, an aqueous liquid containing water-miscible organic compounds, and combinations thereof.

15. The invert emulsion of claim 12 further comprising a weighting agent or a bridging agent wherein the weighting or bridging agent is selected from the group consisting of calcium carbonate, dolomite, siderite, barite, celestite, iron oxides, manganese oxides, and halites.

16. The invert emulsion of claim 12 further comprising a corrosion inhibitor.

17. An invert emulsion fluid having utility for drilling completing, or working over subterranean wells, said fluid comprising:

a nonoleaginous fluid, an oleaginous fluid, said oleaginous fluid comprising at least about 50% by volume of a glycol ether, said glycol ether being miscible in oil and such that less than 10% by volume of the glycol ether is miscible in fresh water at 20° C. and wherein said glycol ether is selected from propylene glycol n-butyl ether; dipropylene glycol n-butyl ether; tripropylene glycol n-butyl ether; tetra propylene glycol n-butyl ether; pentapropylene glycol n-butyl ether; hexapropylene glycol n-butyl ether; heptapropylene glycol n-butyl ether and combinations thereof;

an emulsifying agent and a weighting or bridging agent.

18. The invert emulsion fluid of claim 17 wherein said nonoleaginous liquid is an aqueous liquid selected from the group consisting of fresh water, sea water, a brine containing organic or inorganic dissolved salts, an aqueous liquid containing water-miscible organic compounds, and combinations thereof.

19. The invert emulsion of claim 18 further comprising a corrosion inhibitor, said corrosion inhibitor being selected from phosphates, silicates, borates, zinc compounds, organic amines, benzoic acid, benzoic acid derivatives, phosphate esters, heterocyclic nitrogen compounds, heterocyclic sulfur compounds, organic acids, and combinations thereof.

* * * * *